(12) United States Patent
Phillips et al.

(10) Patent No.: US 7,686,940 B2
(45) Date of Patent: Mar. 30, 2010

(54) ACOUSTIC AGGLOMERATION TO REDUCE FOULING IN THERMAL CONVERSION PROCESSES

(75) Inventors: Glen E. Phillips, Goldvein, VA (US);
Leo D. Brown, Baton Rouge, LA (US);
Michael Siskin, Randolph, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 333 days.

(21) Appl. No.: 11/330,867

(22) Filed: Jan. 12, 2006

(65) Prior Publication Data

US 2006/0196808 A1 Sep. 7, 2006

Related U.S. Application Data

(60) Provisional application No. 60/658,036, filed on Mar. 2, 2005.

(51) Int. Cl.
*C10G 9/16* (2006.01)
*C10G 75/00* (2006.01)
*B01D 51/08* (2006.01)

(52) U.S. Cl. .................................. 208/48 R; 95/29

(58) Field of Classification Search ............... 95/29; 96/389

See application file for complete search history.

(56) References Cited

U.S. PATENT DOCUMENTS

| | | | | | |
|---|---|---|---|---|---|
| 2,300,761 | A | * | 11/1942 | Amy | 95/29 |
| 2,578,377 | A | * | 12/1951 | Smith | 208/158 |
| 3,318,664 | A | * | 5/1967 | Latham, Jr. et al. | 423/455 |
| 3,497,005 | A | * | 2/1970 | Pelopsky et al. | 166/247 |
| 3,616,375 | A | * | 10/1971 | Inoue | 204/157.61 |
| 3,819,740 | A | * | 6/1974 | Hori | 585/539 |
| 4,378,976 | A | * | 4/1983 | Rush | 95/29 |
| 5,763,724 | A | * | 6/1998 | Bellet et al. | 585/648 |
| 6,406,613 | B1 | * | 6/2002 | Nahas et al. | 208/48 R |
| 2003/0200864 | A1 | * | 10/2003 | Meegan, Jr. | 95/29 |
| 2005/0040076 | A1 | * | 2/2005 | Brown et al. | 208/127 |

FOREIGN PATENT DOCUMENTS

SU 1474169 * 4/1989

OTHER PUBLICATIONS

Database WPI, SectionCh, Week 198943 1989, Derwent Publications Ltd., London, GB; AN 1989-315565 XP002387303—& SU 1474169 Abstract, Published Apr. 23, 1989.*

* cited by examiner

*Primary Examiner*—George Wyszomierski
*Assistant Examiner*—Mark L Shevin
(74) *Attorney, Agent, or Firm*—Malcolm D. Keen; Glenn T. Barrett

(57) ABSTRACT

This invention relates to a process for reducing fouling of equipment used in fluidized bed thermal conversion processes such as fluid coking and FLEXICOKING™. Acoustic energy is used to acoustically agglomerate fine mists created during the coking process. The agglomerated mists are then carried along with the circulating coke instead of depositing on coking equipment.

6 Claims, 1 Drawing Sheet

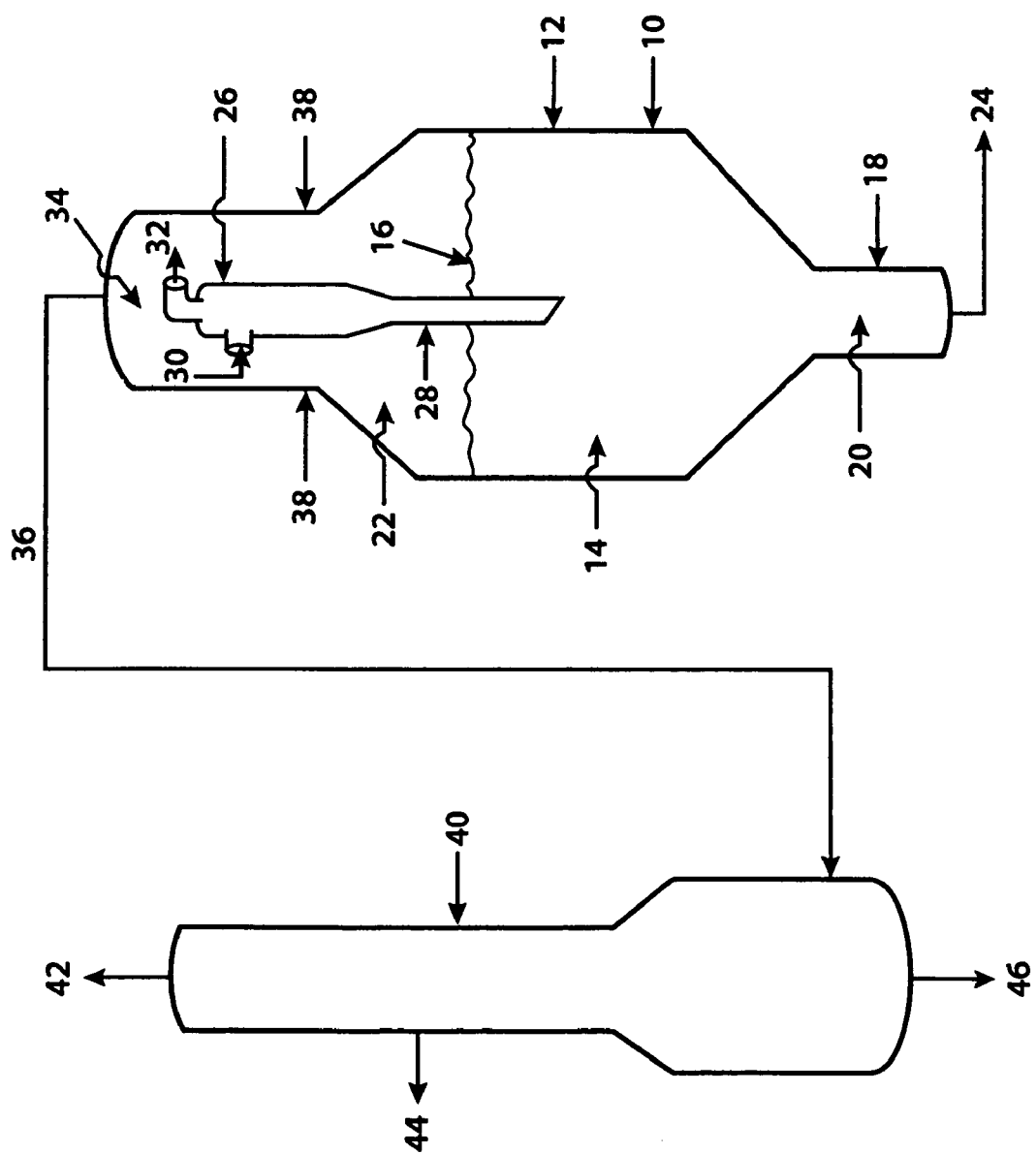

ACOUSTIC AGGLOMERATION TO REDUCE FOULING IN THERMAL CONVERSION PROCESSES

CROSS REFERENCE TO RELATED APPLICATION

This application claims benefit of U.S. Provisional Patent Application Ser. No. 60/658,036 filed Mar. 2, 2005.

FIELD OF THE INVENTION

This invention relates to a process for reducing fouling of equipment used in the fluidized bed thermal conversion processes such as fluid coking and FLEXICOKING™. Acoustic energy is used to acoustically agglomerate fine mists created during the coking process. The agglomerated mists are then carried along with the circulating coke instead of depositing on coking equipment.

BACKGROUND OF THE INVENTION

Fluidized bed coking is a thermal conversion process in which heavy petroleum feeds are thermally cracked in a fluidized bed to form cracked vapor products and solids. In fluid coking and the fluidized bed coking process known as FLEXICOKING™, the thermally cracked vapors are typically passed through cyclones to separate coke fines entrained in the vapors and then through a scrubber. Some of the vapor formed by thermal cracking condenses and deposits on coke circulating in the thermal cracking unit and on various process equipment such as reactors, heat exchangers, reboilers, transfer lines, cyclones and fractionators. Subsequent thermal conversion of the condensed vapors converts them to coke. The process whereby coke is deposited on process equipment is known as fouling. The fluid coking process uses a fluidized bed reactor in which the thermal cracking reactions take place and a burner. The FLEXICOKING™ process uses a similar coking reactor together with a heater and gasifier. The specific configuration of the fluidized bed coking unit is not critical to the present invention.

Fouling is a major operational problem because fouled equipment must be shut down and periodically cleaned to remove coke deposits. Cleaning may be by mechanical means, such as pigging or by spalling/steam spalling, whereby the unit temperature is raised and lowered through several cycles causing coke deposits to break up due to differences in respective thermal expansion coefficients. Spalling may be followed by steam injection at high temperatures. Fouling has been addressed by the addition of chemical antifoulants, use of scouring coke and by control of process conditions such as residence times and temperature differences, e.g., super heat.

Acoustic agglomeration is based on the use of sound to agglomerate small particles in the micron and sub-micron range present in aerosols. The thus agglomerated particles are more susceptible to conventional separation techniques such as cyclones, filters and the like, and to the return of agglomerated particles to the reactor phase. Acoustic sound waves are used to increase the relative molecular motion of the fine particles. This, in turn, results in more frequent collisions in which as least some of the particles stick together forming larger particles. The overall effect of acoustic treatment is to shift the median particle size of the aerosol to larger values. Acoustic agglomeration has been applied to particles in gases such as coat dust, fines from internal combustion engines and fly ash to make the particles larger and thus more susceptible to conventional separation techniques as noted above.

SUMMARY OF THE INVENTION

The present invention relates to the use of acoustic agglomeration to agglomerate the fine aerosol particles created in a thermal conversion process without the need for separating the agglomerated particles from the coke fines created in the thermal conversion process. Accordingly, there is provided a method for reducing fouling from aerosol mists resulting from thermally cracking heavy petroleum feeds which comprises thermally cracking the heavy petroleum feed in a thermal cracking unit to produce coke, coke fines and vapor products containing aerosol mist, and subjecting the vapor products containing aerosol mist to a source of acoustic energy sufficient to cause agglomeration of at least some of the aerosol mist to form agglomerated particles.

In an embodiment of the invention, there is provided a method for reducing fouling from aerosol mists resulting from thermally cracking heavy petroleum feeds in a Fluid Coker or a Flexicoker (the terms Fluid Coker and Flexicoker are used in this specification to refer, respectively, to the process units used for fluid coking and FLEXICOKING™) which comprises thermally cracking the heavy petroleum feed in a Fluid Coker or a Flexicoker to produce coke, coke fines and vapor products containing aerosol mist, subjecting the coke fines and vapor products containing aerosol mist to a source of acoustic energy sufficient to cause agglomeration of at least some of the aerosol mist to form agglomerated particles, and passing the coke fines and vapor products containing agglomerated particles to a separator and separating coke fines and agglomerated particles.

BRIEF DESCRIPTION OF THE DRAWING

The FIGURE is a schematic drawing of a fluid coking process containing transducers for generating acoustic energy.

DETAILED DESCRIPTION OF THE INVENTION

The thermal cracking of heavy petroleum feeds occurs in processes such as delayed coking, visbreaking, catalytic cracking, fluid coking and FLEXICOKING™. Preferred thermal cracking processes include fluid coking and FLEXICOKING™. Heavy petroleum feeds include heavy hydrocarbonaceous oils, heavy and reduced petroleum crude oil, petroleum atmospheric distillation bottoms, petroleum vacuum distillation bottoms, or residuum, pitch, asphalt, bitumen, other heavy hydrocarbon residues, tar sand oil, shale oil, coal, coal slurries, liquid products derived from coal liquefaction processes, including coal liquefaction bottoms, and mixtures thereof. Such feeds will typically have a Conradson carbon content of at least about 5 wt. %, generally from about 5 to about 50 wt. %. As to Conradson carbon residue, see ASTM Test D189-165. Preferably, the feed is a petroleum vacuum residuum (resid).

In delayed coking, heavy feed is sent to a coke drum. The feed is heated to the coking point wherein the heat is supplied in a furnace and the heated feed is then introduced to the coke drum where the residence time for the coking reactions is provided. The coke drums are usually run in parallel so that one drum can be used for coking while the other drum is being cleaned of coke. Delayed coking produces sponge coke, needle coke or shot coke, depending on feed and reactor conditions and the presence of additives in the feed. Delayed cokers do not typically use cyclones as the feed to be coked is heated to the coking temperature and held in the coker drum until a solid mass of coke is formed in the drum. Vapors from the coke drum are sent to a fractionator where they are separated into product cuts based on boiling points.

The full drum is steamed to remove remaining hydrocarbons. Coke is removed from the cooled drums by mechanical means such as a drill or by using a hydraulic system usually comprising a multiplicity of high pressure water jets.

In fluid coking, a heavy feedstock, such as a vacuum residuum, is fed to a coking zone comprised of a fluidized bed of hot solid particles, usually coke particles, sometimes also referred to as seed coke. The feedstock is reacted in the coking zone maintained at temperatures is the range of about 850° F. to about 1200° F. (454° C. to 649° C.), resulting in conversion products which include a vapor fraction and coke, which coke is deposited on the surface of the seed coke particles. A portion of the coked-seed particles is sent to a heating zone which is maintained at a temperature higher than that of the coking zone. Some of the coke is burned off in the heating zone. Hot seed particles from the heating zone are returned to the coking zone as regenerated seed particles, which serve as the primary heat source for the coking zone. Solid particles are separated from vapor products in a cyclone. Vapor products are then sent to a fractionator.

In a FLEXICOKING™ process, a third major vessel is added to gasify the product coke. A coking reactor, a heater (vs. burner) vessel, and a gasifier are integrated into a common fluidized-solids circulating system. A material stream circulates continuously between a reactor and a heater. More specifically, a feed stream is fed into a fluidized bed, along with a stream of hot recirculating material. From the reactor, a stream containing coke is circulated to a heater vessel, where it is heated. The hot coke stream is sent from the heater to a gasifier, where it reacts with air and steam. The gasifier product gas, referred to as coke gas, containing entrained coke particles, is returned to the heater and cooled by cold coke from the reactor to provide a portion of the reactor heat requirement. A return stream of coke sent from the gasifier to the heater provides the remainder of the heat requirement. Hot coke gas leaving the heater is used to generate high-pressure steam before being processed for cleanup. Coke is continuously removed from the reactor. The purge coke (about 0.5% of the product coke) from the FLEXICOKING™ process normally contains about 99% of the feed metals and has a volatile content of about 2 wt. % to about 7 wt. %.

For illustrative purposes, a fluidized bed coking process unit reactor is shown in the FIGURE. In broad terms, the operation of a coking unit proceeds as follows: a heavy hydrocarbonaceous chargestock is passed via lines 12 to coking zone 14 of coker reactor 10, which coking zone contains a fluidized bed of solid, or so-called "seed" particles, having an upper level indicated at 16. A fluidizing gas, e.g. steam, is admitted at the base of coker reactor 10, through conduit 18, into stripping zone 20 of the coking reactor in an amount sufficient to obtain a superficial fluidizing velocity. Such a velocity is typically in the range of about 0.5 to about 5 ft/sec. The feedstock is heated to a temperature sufficient to cause a portion of the decomposed feed to form a fresh coke, or carbonaceous material, layer on the hot fluidized particles. The solids are partially stripped of fresh coke and occluded hydrocarbons in stripping zone 20 by use of a stripping gas, preferably steam and passed via line 24 to heater (not shown) which is operated a temperature from about 40° C. to about 200° C., preferably from about 65° C. to about 175° C., and more preferably about 65° C. to about 120° C. in excess of the actual operating temperature of the coking zone. A portion of the stripped coke may be burned to satisfy heat requirements of the coking zone, and remaining coke may be recycled to the coking zone or withdrawn as product coke.

The pressure in the coking zone is maintained in the range of about 0 to about 150 psig, preferably in the range of about 5 to about 45 psig. Conversion products from the coking zone are passed through cyclone inlet 30 into cyclone system 26 of the coking reactor to remove entrained solids which are returned to the coking zone through dipleg 28. The vapors leave the cyclone through outlet 32, and pass through an internal head (not shown) separating reactor and scrubber and into scrubbing zone 34, at the top of the coking reactor. If desired, a stream of heavy materials condensed in the scrubber may be recycled to coking reactor 10. The coker conversion products are removed from the scrubbing zone 34 via line 36 for fractionation in fractionator 40. In fractionator 40, coker conversion products are fractionated into light streams such as naphtha and removed through line 42, intermediate boiling streams such as light gas oils and removed through line 44 and heavy streams removed as bottoms through line 46. Acoustic generators 38 are placed around coker 10 such that they are located between the top of the coker bed 16 and the entrance to cyclone 30; the dilute phase. The acoustic generators preferably penetrate the outer wall of the coker reactor and any refractory that may be used to line the coker reactor.

Acoustic generators generate acoustic energy in the form of sound waves to agglomerate fine particles present in aerosol mists over coker beds. Such agglomeration can be by coagulation with other fine particles to form larger particles or by coagulation with larger particles with the net result of an increase in the median size to a larger value. Acoustic agglomeration of aerosol mists is in part a function of the particle sizes and particle concentration in the mist. In the dilute phase above the top of the coker bed and the entrance to the cyclone, there are dry solid particles, solid particles coated with a partially dried heavy and sticky liquid film, droplets of heavy liquid ranging from submicron to approximately 20 micron range, hydrocarbon vapors and super heated steam. Heavy liquid droplets in the 5 to 10 micron range are the most likely to deposit on surfaces in the coker/cyclone, so it would be desirable to agglomerate these droplets in order to remove them so that they do not form coke. By agglomerating these heavy liquid droplets to the 20 to 80 micron range, they will be separated in the cyclone. Droplets greater than about 20 microns have an increased probability of colliding with dry solid particles to form larger particles having the combined mass of the droplet and the particles. This is an aid to removal in the cyclone.

For the present particle size distribution, the sound (acoustic) waves are in the frequency range from about 600 to about 20,000 Hz, preferably from about 3,000 to about 10,000 Hz. The sound intensity, which is a measure of the acoustic energy transmitted to the aerosol mist, is in the range from about 90 to about 160 dB, preferably from about 120 to about 150 dB. The duration of the sound waves is for a time sufficient to cause the desired degree of coalescence of mist. This is typically in the range of a few seconds and depends on the operating conditions within the coker unit. Generally the residence time from the top of the bed to the cyclone inlet is in the range of about 5 to about 10 seconds. At a given frequency, it is preferred to use higher acoustic energy. It is preferred to adapt the sound wave frequency, acoustic energy and the geometry of the coker system to achieve a standing wave condition. The orientation of sound source relative to the flowing particles of aerosol mist is such that the sound waves penetrate across the column of flowing particles of aerosol mist. The sound generators may be oriented perpendicular to the flowing column or may be oriented at an angle varying from perpendicular to parallel to the flowing column. The type of acoustic generator may be any of a variety of commercially available sound generators such as transducers, sirens, air horns, electromagnetic sonic devices and the like.

In a Fluid Coker or Flexicoker, the vapor products above the fluidized coke bed include aerosol mists. Such mists are carried by the vapor products and deposit on equipment where they collect. These deposits may foul the equipment leading to equipment down time. Such fouling is normally handled by increasing the operating temperature of the dilute phase above the reactor bed to limit the amount of physical condensation and to dry the surface of the particles. This, however, is accomplished at the expense of yield loss due to secondary cracking. This does not provide adequate fouling control. Such fouling leads to the need for periodic cleaning and shutting down of the coker units. An example of such cleaning is by high pressure water lancing which is used to limit the pressure drop increase across the cyclones. In the present process, agglomerated aerosol mist coalesces on circulating coke particles and is returned to the coke bed. This protects downstream equipment such as cyclone internals, transfer pipes and fractionators from particles that could lead to fouling.

The following non-limiting example is based on modeling studies and illustrates the process of the invention.

EXAMPLE

A Fluid Coker during typical initial operation usually requires water lancing to the cyclone snout area every six months. Lancing of the cyclone snout area occurs at about two month intervals after running for about one year. Transducer device(s) between the coke bed and cyclone snout result in extending the intervals between lancings. Transducers accomplish this by tuning the transducer(s) to produce standing sound waves capable of coalescing the submicron particles in the aerosol mist above the coke bed to particles in the range of about 10 microns average size. This reduces the amount of submicron mist particles entering the cyclone inlet and subsequently condensing on and forming coke deposits on interior surfaces. Without the use of transducer(s) or other acoustic producing devices, coke deposit formation may increase at an accelerated rate with time on stream over a system with the acoustic producing device such that deposits would increase in thickness and build pressure drop requiring increased frequency of lancing and an eventual shut down of affected units. Use of standing sound waves after unit turnaround is a preferred method of unit operation to extend the periods of operating between lancings.

The invention claimed is:

1. A method for reducing fouling in equipment downstream of a fluidized bed coking zone of a fluidized bed petroleum coking unit having a fluidized bed coking zone end an outlet by way of a cyclone system for removing entrained solids and in which the cyclone system is subject to fouling from liquid droplets in aerosol mists from the fluidized bed coking zone, which method comprises coking a heavy petroleum feed in the fluidized bed coking zone of the unit and to produce coke, coke fines and vapor cracking products containing an aerosol mist of liquid droplets in the dilute phase over the fluidized bed and before the inlet of the cyclone system, and subjecting the vapor products containing the aerosol mist in the dilute phase to a source of acoustic energy located between the coking zone and the inlet of the cyclone system, to cause agglomeration of at least some of the liquid droplets in the aerosol mist to form agglomerated liquid droplets in the aerosol mist that coalesce on circulating coke particles which are returned to the fluidized bed coking zone.

2. The method of claim 1 wherein the heavy petroleum feed has a Conradson carbon content of at least 5 wt. %.

3. The method of claim 1 wherein the fluidized bed coking zone of the fluidized bed petroleum coking unit is maintained at a temperature of from about 454° C. to about 649° C.

4. The method of claim 1 wherein the liquid droplets in the aerosol mist in the dilute phase are agglomerated to form particles sizes in the range of from about 20 to about 80 microns.

5. The method of claim 1 wherein the acoustic energy is in the frequency range from about 600 to about 20,000 Hz.

6. The method of claim 1 wherein the acoustic energy is in the form of a standing wave.

* * * * *